(12) United States Patent
Kraiman et al.

(10) Patent No.: US 9,066,138 B1
(45) Date of Patent: Jun. 23, 2015

(54) REPLACING ADS IN HTTP-BASED MANIFEST DRIVEN VIDEO TRANSPORT

(75) Inventors: Stephen J. Kraiman, Doylestown, PA (US); Guy W. Cherry, Beaverton, OR (US)

(73) Assignee: ARRIS Solutions, Inc., Suwanee, GA (US)

( * ) Notice: Subject to any disclaimer, the term of this patent is extended or adjusted under 35 U.S.C. 154(b) by 146 days.

(21) Appl. No.: 13/468,082

(22) Filed: May 10, 2012

Related U.S. Application Data

(60) Provisional application No. 61/484,534, filed on May 10, 2011.

(51) Int. Cl.
*H04N 7/10* (2006.01)
*H04N 7/025* (2006.01)
*H04N 21/458* (2011.01)

(52) U.S. Cl.
CPC .................................. *H04N 21/458* (2013.01)

(58) Field of Classification Search
None
See application file for complete search history.

(56) References Cited

U.S. PATENT DOCUMENTS

| 2009/0025026 | A1* | 1/2009 | Mick et al. | 725/32 |
|---|---|---|---|---|
| 2010/0251278 | A1* | 9/2010 | Agarwal et al. | 725/9 |
| 2012/0047542 | A1* | 2/2012 | Lewis et al. | 725/97 |
| 2012/0198492 | A1* | 8/2012 | Dhruv et al. | 725/32 |

* cited by examiner

*Primary Examiner* — Oschta Montoya
(74) *Attorney, Agent, or Firm* — Bart A. Perkins

(57) ABSTRACT

Methods, systems, and apparatuses can replace content within a manifest driven streaming video program. A generic manifest file can be retrieved, original content within the streaming program can be identified for replacement, and a user specific manifest file can be generated that includes references to replacement content instead of the original content identified for replacement.

13 Claims, 5 Drawing Sheets

REPLACING ADS IN HTTP-BASED MANIFEST DRIVEN VIDEO TRANSPORT

RELATED APPLICATIONS

This application claims priority as a non-provisional utility of U.S. Provisional Patent Application Ser. No. 61/484,534, entitled "A Mechanism to Replace Ads in HTTP based manifest Driven Video Transport", filed May 10, 2011, which is hereby incorporated herein by reference in its entirety.

TECHNICAL FIELD

This disclosure relates to ad insertion in video content.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types.

The use of IP (Internet Protocol) to transport digital video is moving rapidly from user datagram protocol (UDP) and proprietary transports like Adobe real-time messaging protocol (RTMP) to the progressive download of a series of small files over a hypertext transfer protocol (HTTP) transport. This can be identified as segmented HTTP Transport (SHT). SHTs typically use a construct called a manifest file to tell the client how to request the segments in the appropriate order.

One feature that has been layered on top of SHTs can be identified as adaptive streaming. Rather than just encoding a piece of video for a single quality/bit rate, that piece of video can be encoded for multiple bit rates. In effect systems using this technology produce N versions of the same piece of video, one for each bit rate. In this example, the manifest file construct is extended with information that allows the client to request different bitrates as it adapts to network traffic conditions.

The client can use a variety of algorithms to determine which bitrate it will choose. If operating conditions such as network congestion cause the client to run out of data or the CPU load causes the client to drop video frames, then the client can choose a lower quality version for the next segment in the sequence. Conversely, if the content is arriving quickly, the client can ask for a higher quality version of the next segment.

Another improvement added to adaptive SHTs is live streaming. Live SHTs are similar to on demand SHTs, but include two significant differences: 1) because the content is being encoded in real-time, new segments are being created, so the manifest file is constantly updated; 2) because the content is being produced and consumed at about the same time, the client continues to request updated versions of the manifest file to receive information on how to request the newly added segments of video.

The move to the HTTP transport can provide a number of benefits over proprietary or using a UDP-based transport. For example, HTTP is a standard that is broadly supported by network equipment like routers and CPE. Problems related to network address translation (NAT) that can occur with UDP-based transports are not an issue with HTTP, which is based upon transmission control protocol (TCP). While there are multiple proprietary implementations of SHTs, if the SHTs are well behaved, the content segments can be cached in a traditional edge cache. The use of a content delivery network (CDN), which includes globally distributed edge caches, provides a generic way to provide cost effective scale for content delivery.

In existing implementations, advertising is inserted into the content before the content is encoded. Delivering a customized version of live or stored video content can involve multiple versions of the same content being created. Such implementations can involve encoding and storing the multiple versions of the content individually. In a city like Los Angeles there may be 90 ad zones, which would result in 90 unique instances of the same program. Not only is the encoding and a storage facility costly for this kind of configuration, the benefits of user specific advertising that is expected for internet based technologies are not realized.

One method that has been used to address this operational inefficiency is to have the client device implement the ad splicing function. With this approach the client is notified that the ad is to be inserted into the video content. The client then requests a replacement ad from an ad server and at the appropriate time, stops video play back of the content, plays the replacement ad, and then resumes playback of the video at the appropriate place. This solution is not optimal because there can be significant overhead in starting a second video stream. For example, there can be a long delay for the video player to load up its buffers. It can also be inefficient because two pieces of video content are being downloaded at the same time.

BRIEF DESCRIPTION OF THE DRAWINGS

Like reference numbers and designations in the various drawings indicate like elements.

DETAILED DESCRIPTION

In some implementations of this disclosure, systems and methods can operate to replace advertisement references within a manifest file for a video transport within a manifest driven video transport paradigm. Such replacement advertisement references can operate to replace advertisements provided to a user by a client device within the transport stream, thereby providing a customized transport stream to a user or group of users.

Figure 1:
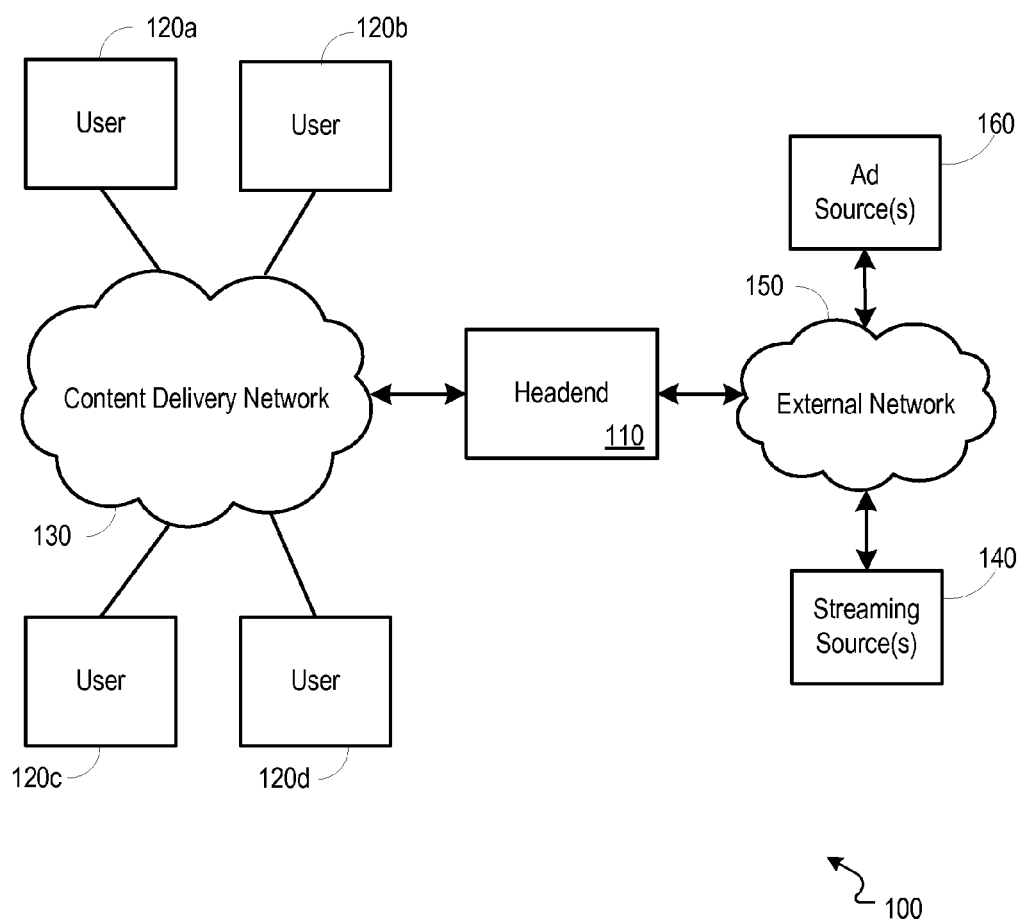
FIG. 1 is a block diagram illustrating an example network environment operable to provide ad replacement in manifest driven video transports.

FIG. 1 is a block diagram illustrating an example network environment 100 operable to replace ads within an HTTP based manifest driven video transport. In some implementations, a headend 110 can provide video, data and/or voice service(s) to one or more users 120a-d (e.g., cable modem(s) and/or set-top box(es)). In some examples, the headend 110 can include devices such as an edge quadrature amplitude modulation (EQAM) device, a cable modem termination system (CMTS), a digital subscriber line access multiplexer (DSLAM), etc. The video, data and/or voice service(s) can be provided to the user through a content delivery network (CDN) 130.

In some implementations, video streams can be received from a streaming source (or sources) 140 through an external network(s) 150 (e.g., including an IP network such as the internet). In some implementations, these video streams can enter the system as raw moving picture experts group (MPEG) streams, or any other streaming video protocol supported by the headend 110 and/or EQAM device 130.

In other implementations, video streams can be received by a CMTS from a streaming source 140. The streaming source 140 can receive requests for video service via the CMTS, and provide the requested video to the CMTS. The CMTS can address the video to one or more users 120a-d and forward the addressed video to the QAM for modulation onto a carrier signal.

In some implementations, the CMTS can forward received packets to an EQAM device used to modulate the signal onto a carrier waveform. The carrier waveform can include both data and video streams, in both multicast and unicast (e.g., point-to-point) formats for transmission to a combiner, which can combine multiple signals onto a single fiber for transmission to one or more service groups via the content delivery network 130 (e.g., a hybrid fiber-coax (HFC) network). In other implementations, the CMTS can modulate a baseband signal to a carrier wave and transmit the signal to a combiner for transmission to the end user.

In some implementations, customized advertisement streams can include advertisements provided by an ad source 160. The advertisements can be provided to the headend 110 through the external network 150. Systems and methods that lie between the streaming source(s) 140 and the users 120a-d can be used to provide advertisements within an HTTP-based manifest driven video transport.

Figure 2A:
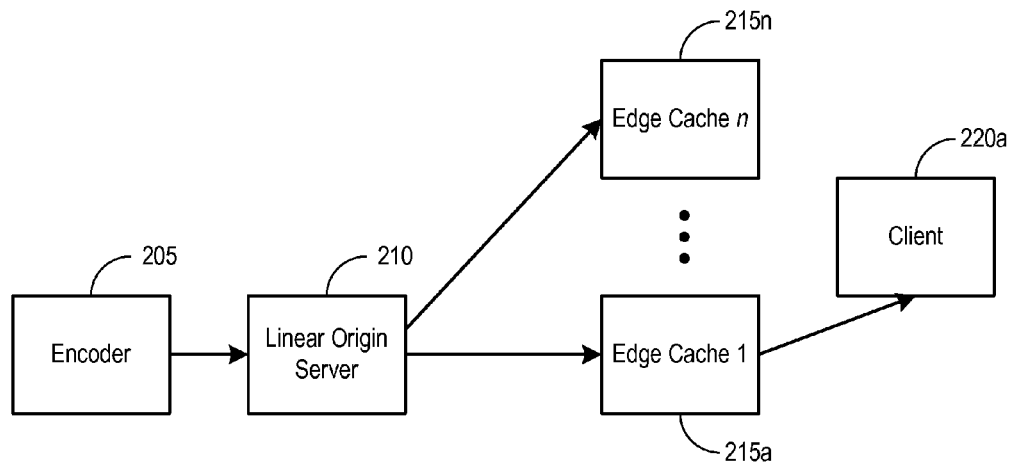
FIGS. 2A-C are block diagrams of video systems illustrating examples of an manifest server operable to replace ads in a manifest driven video transport.

FIG. 2A is a block diagram of an example linear streaming system operable to provide only a generic stream to customers. In this example, an encoder 205 encodes content and advertisements into a single stream, and provides the generic stream to a linear origin server 210. The encoded stream can be in any digitally encoded format operable to be transmitted across the network (e.g., motion pictures expert group (MPEG) 1, MPEG 2, MPEG 4, AVL H.264, AVC, VC1, etc.). A manifest file can also be generated, which facilitates the retrieval of the encoded fragments of the video content. The single stream includes the content provided by one or more content providers, as well as advertisements (if any) embedded within the stream. While the advertisements can be customized between linear content servers, the system does not include a mechanism to customize the advertisements on a more granular basis (e.g., per customer or per edge cache).

The linear origin server 210 is then operable to distribute the linear stream to multiple edge cache systems 215a . . . 215n. The linear origin server 210 can duplicate the content and send the content to the various edge cache systems 215a-215n receiving the encoded content. The linear origin server 210 can also apply addressing information to the streams including broadcast addressing, multicast addressing or unicast addressing. In some examples, the addressing can be to the edge cache devices, while in other examples, the addressing can be to client devices 220a.

The edge cache system 215a . . . 215n can provide the received stream to client devices 220a. The client devices can be any of set top boxes, mobile devices, tablets, smart televisions, video gateway devices, etc. The client devices 220a can be coupled to respective display devices to output the streaming content to a display.

Figure 2B:
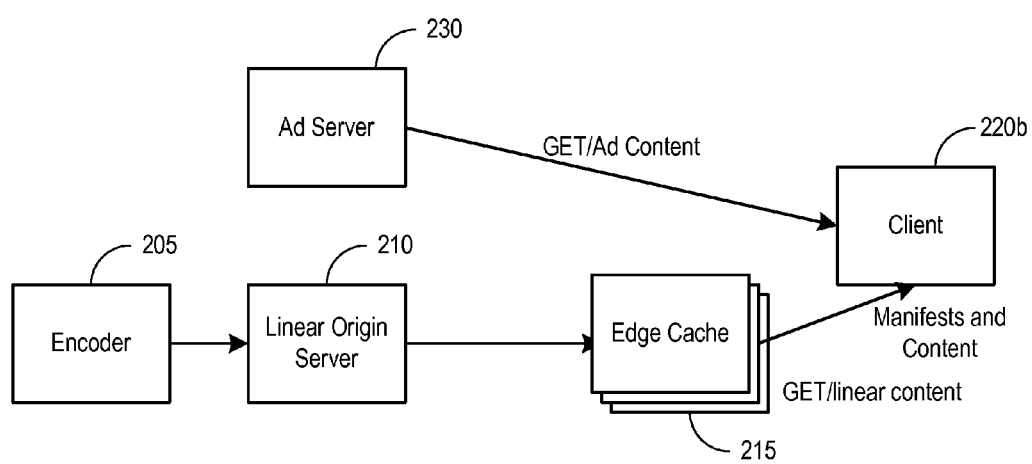

FIG. 2B is a block diagram of an example streaming system operable to provide content with non-linear advertising to users. In this example, an encoder 205 encodes content (e.g., excluding or including advertisements) into a single stream, and provides the stream and manifest file to a linear origin server 210. The single stream can include tagging information identifying the location of advertisement slots within the content stream. The encoder can provide the manifest file to identify the locations from which the encoded content fragments can be retrieved and locations from which to retrieve advertisements for insertion into the content stream.

The linear origin server 210 is then operable to distribute the content stream and manifest file to edge caching systems 215, which then distributes manifest files and the content stream to client devices 220b. The client devices 220b can recognize the tagging information and use the manifest file to determine when and where to retrieve advertisements for inclusion within the content stream. When the manifest file instructs the client device 220 to retrieve content from an ad server 230, the client device 220 can sends a GET message to the advertising server 230 to receive the ad content.

Figure 2C:
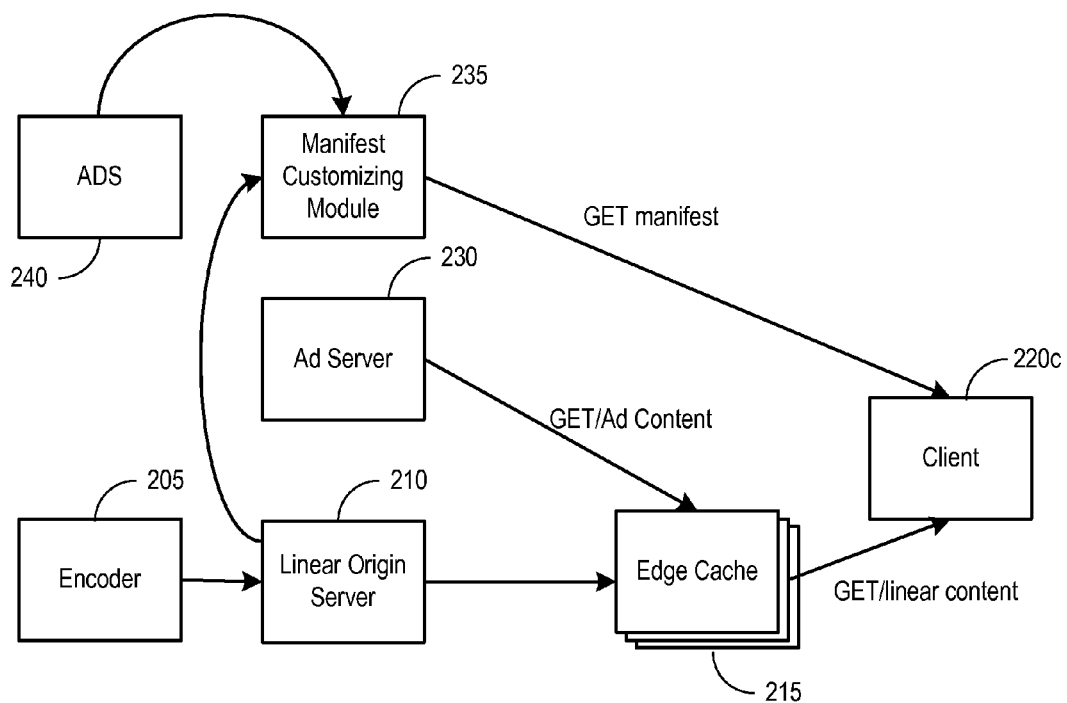

FIG. 2C is a block diagram of an example streaming system operable to provide customized manifests to clients. In this example, an encoder 205 encodes content (e.g., excluding or including advertisements) into a single stream, and provides the stream and manifest file to a linear origin server 210. The single stream can include tagging information identifying the location of advertisement slots within the content stream.

The manifest file can be a generic manifest file for the stream. In some implementations, the linear origin server can communicate the manifest file to a manifest customizing module 235. The manifest customizing module 235 can customize the manifest for an individual user or group of users, and communicate a user specific manifest to the client device 220c associated with that user or group of users. In some implementations, the manifest customizing module 235 can communicate with an ad decision service 240 to identify advertisements for a specific user/client device 220. For example, a generic manifest might read:

EXTM3U
EXT-X-TARGETDURATION:10
EXT-X-MEDIA-SEQUENCE:8763
EXTINF:10,
20110505T080857-01-8763.ts
EXTINF:10,
20110505T080857-01-8764.ts
EXTINF:10,
20110505T080857-01-8765.ts

Upon receiving the manifest, the manifest customizing module 235 can retrieve content fragments associated with the manifest and identify tags within the content (e.g., SCTE 35 triggers). It should be understood that in other implementations, the location of an ad to be replaced can be identified by an external component (e.g., an ad identification module) and can be passed to the manifest server. At these triggers, the manifest customizing module 235 can request an ad decision from an ad decision service 240. Upon receiving the ad decision from the ad decision service 240, the manifest can be customized by modifying the manifest using the targeted fragments received from the ad decision service 240. After modification, the user specific version of the generic manifest can read:

EXTM3U
EXT-X-TARGETDURATION:10
EXT-X-MEDIA-SEQUENCE:8763
EXTINF:10, http://cndn.twc.origigin/foo/bar/20110505T080857-01-8763.ts
EXTINF:10,
http://xms.origin/pepsi/diet_pepsi.0.ts
EXTINF:10,
http://cdn.xms.origin/pepsi/diet_pepsi.0.ts Thus, the manifest server can modify the base or generic manifest file such that it changes entries that refer to segments for an ad in the original content with entries that refer to segments of an ad that has been selected for a specific client or user, thereby creating a customized video stream for a user or group of users.

The user specific manifest can be communicated from the manifest customizing module 235 to the client device 220 to facilitate retrieval of the linear content and retrieval of the customized advertisement content from the edge cache device(s) 215.

Figure 3:
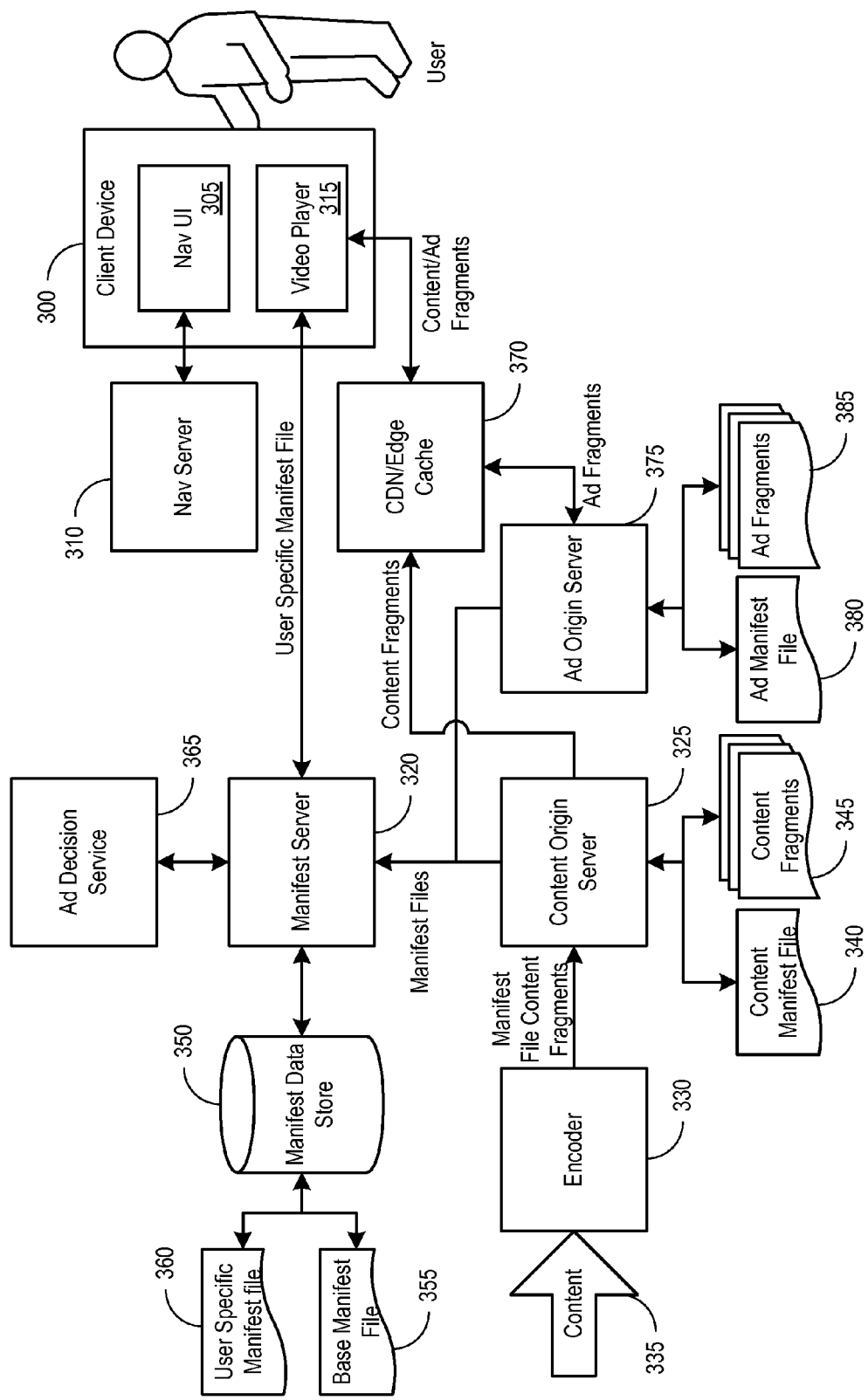
FIG. 3 is a block diagram illustrating another example video system using a manifest server to replace ads in a manifest driven video transport.

FIG. 3 is a block diagram of another implementation of an ad replacement system for manifest driven video transports. In some implementations, when a user would like to use a client device 300 to watch video content, he/she uses a navigation user interface (UI) 305 to navigate content selections. The content selections, for example, can be populated using an external navigation server 310. In various implementations, the content selections can be retrieved "on-the-fly" or can be pre-cached within the client device.

Upon selecting one of the content selections, the navigation UI 305 associated with the client device 300 requests a universal resource identifier (URI) from the navigation server 310. The URI points to the manifest server. The URI may also contain information that uniquely identifies the user or the client device. This information may be in the form of a cookie or it may be embedded directly in the manifest URI.

After receiving the URI from the navigation server 310, the video player 315 can send a request for a manifest file to a manifest server 320. The manifest server maps the user specific manifest URI to the original manifest file and checks to see if the cached version of the manifest file is up to date. If the manifest file is not up to date, the manifest server fetches the latest version of the original manifest file from the origin server.

In some implementations, the manifest server 320 can request the manifest file from a content origination server 325 upon receiving the manifest file request from the user device 300. The content origination server 325 has typically previously received encoded content from an encoder 330. The encoder 330 can operate to encode content 335 received from a content source. The content origination server 325 can store the content manifest file 340 and the content fragments 345 to a data store (e.g., using a redundant array of independent disks (RAID) storage architecture). When the manifest server 320 requests the manifest file 340, the content origination server 325 can provide the manifest file 340 to the manifest server 320.

The manifest file 340 can be cached by the manifest server 325 in a manifest data store 350 as a base manifest file 355. In some implementations, the manifest server pre-caches base manifest files 355 for video content to a manifest data store 350. The manifest data store 355 can also include a user specific manifest file 360. The manifest server 325 can retrieve the base manifest file 355 and request content fragments associated with the base manifest file 355 and can parse the retrieved fragments to identify tags (e.g., SCTE 35 triggers) within the content and determine whether any of the fragments are to be replaced (e.g., replacing an advertisement).

In some implementations, when a tag is located, the manifest server 325 can call an ad decision service 365 to identify an advertisement for inclusion within a user specific manifest file. Upon identification of a replacement advertisement for inclusion in the manifest file, the manifest server can modify the manifest file to create a user specific manifest file by retrieving replacement advertisement manifest information 380 from an advertisement origin server 375. The user specific manifest file can include identification of targeted advertisement fragments. It should be understood that targeted ad references may be directed to any of one or more servers, and can further or alternatively include an embedded ad server within the client's own local network that utilizes DVR HDD capacity or other local cache (e.g., media extender, media server, etc.).

The user specific manifest file can then be communicated to the video player 315. The video player 315 can use the user specific manifest file to request content fragments from the content delivery network (CDN)/edge cache device 370. When the video player requests content fragments, the CDN/edge cache device 370 can retrieve the content fragments 345 from the content origin server 325. Alternatively, when the video player request advertisement fragments, the CDN/edge cache device 370 can retrieve ad fragments 385 from the advertisement origin server 375. The CDN/edge cache device 370 can then deliver the content fragments 345/ad fragments 385 to the video player 315.

Thus, it should be recognized that a customized manifest file resulting in a customized video stream can be delivered to a user or group of users. Some benefits to this customization can include:

Leveraging the CDN architecture for the delivery of advertisements to a client for both the original content and the advertisements.

Targeting an advertisement to an individual user or client.

Decoupling one client from other clients accessing the same linear stream can provide some flexibility to allow various ad segments to run longer or shorter as long as the overall time slots for a program are not violated.

In some implementations, the encoder 330 can detect tags within the original content stream (e.g., including original advertisement) and can split the fragments such that the fragments do not include both content and advertisements (e.g., the advertisements do not include portions of the content, and the content does not include portions of the advertisements). In some implementations, the encoder can pass the tags (e.g., SCTE 35 triggers or cues) into the transcoded content, thereby facilitating replacement of advertisements within the stream. In other implementations, the encoder can provide the cue message information to the manifest server as metadata embedded in the manifest file.

It should be understood that in some implementations, portions of the content itself can be tagged for replacement by the manifest file. For example, a portion of content can be marked as graphic or unsuitable for children. Based upon user specific information, such portions can be replaced by another version of the content (e.g., a version of the content suitable for children).

Various optimizations can be made to return all of the fragments for the ad, even if the original manifest did not contain that much content. This can be done for the example of a live stream. In such examples, the ad is served to the same place for different bitrates of the content, and as such the search can be performed once. The location information can be applied to all bit rates of the same piece of content.

In some implementations, the manifest server can allow an individual's ad sequence to overrun the time slot allocated within limits, and then adjust the timestamps of the succeeding fragments to compensate for the overrun. Such an overrun and compensation sequence facilitates customized ad campaigns to view all ad avails within a program as a block of time that can be flexibly allocated. The total time spent in ads should remain within that allotted to it within the program, but the segments can increase or decrease so long as the total is unchanged. This functionality involves the ad decision server or the manifest server having knowledge of the number and length of ad avails within a program. For on demand content, this feature can also allow a premium user to view reduced ad content, or a bargain user to get extra ad segments in a partially or wholly subsidized viewing.

It should be understood that the manifest server is not necessarily an individual machine. In some implementations the manifest server can be a cluster of machines, e.g., behind a HTTP load balancer. Moreover, a manifest server can be mapped to a specific geographic or business region, and the navigation server may explicitly point to a specific regional manifest server. DNS redirection technology used by CDNs can thereby be used to direct requests to particular manifest servers. The manifest server can report back to the ad decision service when an ad adjusted manifest has been delivered in its entirety (e.g., via SCTE 130 PSNs or other notifications). In some examples of the description above it is assumed that the encoder breaks video segments at ad boundaries, however, the manifest server can alternatively perform this function.

Figure 4:
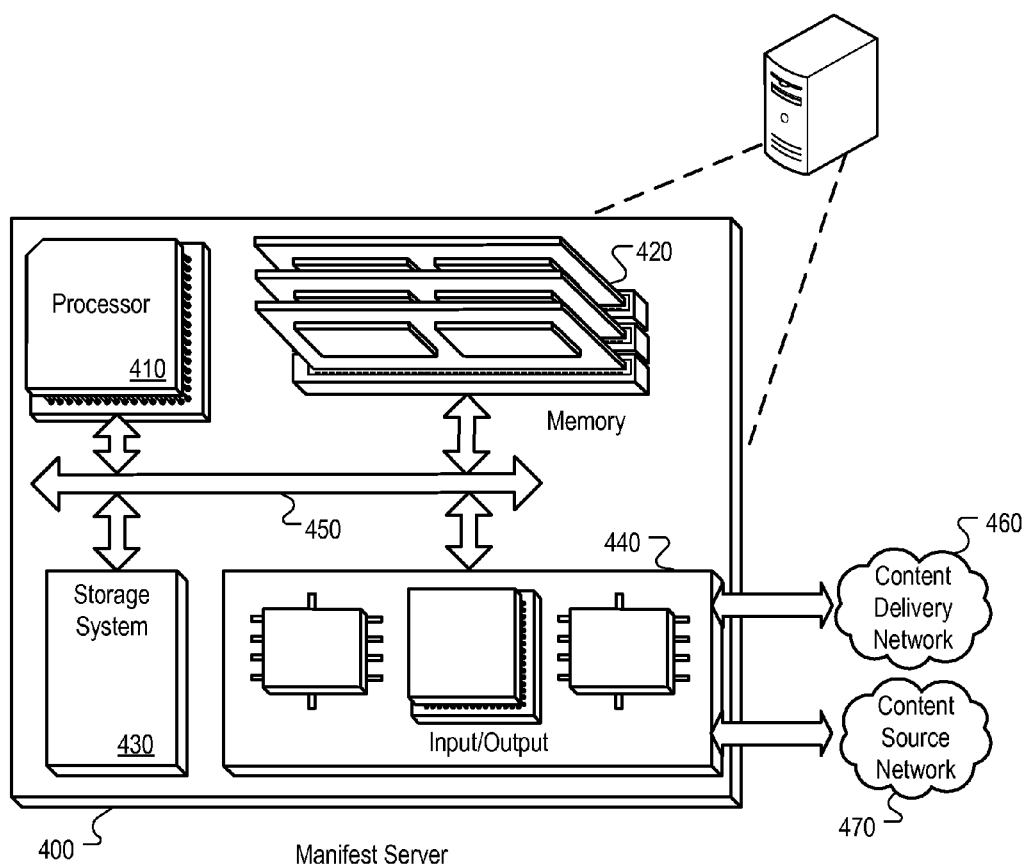
FIG. 4 is a block diagram of a manifest server operable to replace ads in a manifest driven video transport.

FIG. 4 is a block diagram of an example manifest server operable to replace advertisement references within a manifest file, thereby providing a user specific manifest file to a client device. However, it should be understood that many different kinds of network devices (e.g., including network hubs, bridges, routers, edge termination devices, etc.) can implement a packet loss identification mechanism. The manifest server 400 can include a processor 410, a memory 420, a storage device 430, and an input/output device 440. Each of the components 410, 420, 430, and 440 can, for example, be interconnected using a system bus 450. The processor 410 is capable of processing instructions for execution within the manifest server 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the server 400. In one implementation, the memory 420 is a computer-readable medium. In one implementation, the memory 420 is a volatile memory unit. In another implementation, the memory 420 is a non-volatile memory unit.

In some implementations, the storage device 430 is capable of providing mass storage for the server 400. In one implementation, the storage device 430 is a computer-readable medium. In various different implementations, the storage device 430 can, for example, include a hard disk device, an optical disk device, flash memory or some other large capacity storage device.

The input/output device 440 provides input/output operations for the server 400. In one implementation, the input/output device 440 can include a network interface device, e.g., an HFC network 460 interface or a packet network 470 interface. Other implementations, however, can also be used, such as mobile computing devices, mobile communication devices, set-top box television client devices, etc.

The manifest server and/or ad replacement system described by this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
   receiving a request for a video content from a client device in a manifest driven video system, wherein the video content is to be delivered to the client device using adaptive bitrate streaming;
   retrieving a generic manifest file associated with the requested video content;
   identifying original advertisement content within the requested video content based upon the retrieved generic manifest file, the identifying comprising: retrieving content fragments based on references in the generic manifest file, and analyzing the retrieved content fragments for SCTE 35 markers identifying advertising content;
   determining whether any of the identified original advertisement content within the requested video content are to be replaced;
   requesting identification of replacement advertisement content from an advertising decision service;
   modifying the generic manifest file to produce a user specific manifest file based upon determining that one or more advertisements associated with the identified original advertisement content within the requested video content are to be replaced, the user specific manifest file including references to replacement advertisement content, in place of the identified original advertisement content within the requested video content;
   providing the user specific manifest file to the client device; and
   wherein an encoder has broken the content fragments at the edges between advertisements content and video program content.

2. The computer-implemented method of claim 1, further comprising:
   providing video fragments to the client device based on requests received from the client device using the user specific manifest file; and
   providing replacement advertisement fragments to the client device based on requests received from the client device using the user specific manifest file.

3. The computer-implemented method of claim 1, further comprising:
   retrieving a replacement advertisement content manifest file from an advertisement server;
   wherein modifying the generic manifest file comprises replacing references to the one or more advertisements identified by the generic manifest file with references to the replacement advertisement content based upon the retrieved replacement advertisement content manifest file.

4. The computer-implemented method of claim 1, wherein the client device is operable to use a navigation server to request the video content.

5. The computer-implemented method of claim 4, wherein the request includes a universal resource identifier operable to uniquely identify the manifest server and the client device requesting the video content.

6. The computer-implemented method of claim 5, wherein the universal resource identifier comprises one or more of a cookie or embedded information in the universal resource identifier for the manifest file.

7. The computer-implemented method of claim 1, wherein retrieving the generic manifest file comprises:

retrieving a first version of the generic manifest file from a local cache;

determining whether the first version of the generic manifest file is up to date; and if the first version of the generic manifest file is not up to date, retrieving a new version of the generic manifest file from a content origination server.

8. A system, comprising:

a manifest server operable to receive a request for video content from a client device, wherein the video content is to be delivered to the client device using adaptive bitrate streaming;

a content origination server operable to provide a generic manifest file to the manifest server, the generic manifest file identifying fragments of program content and advertising content associated with the requested video content;

an advertising decision service operable to request identification of replacement advertisement content; and wherein the manifest server is further operable to receive the generic manifest file and identify original advertising content within the requested video content by retrieving content fragments based on references in the generic manifest file and analyze the retrieved content fragments for SCTE 35 markers identifying advertising content, to identify replacement advertising content for the requested video content, to update the manifest file with references to the replacement advertising content in place of the identified original advertising content thereby producing a user specific manifest file, and to provide the user specific manifest file to the client device;

wherein an encoder has split the content fragments at the edges between advertisement content and video program content.

9. The system of claim 8, further comprising:

an advertising server operable to provide replacement advertisement content fragments to the client device based on requests received from the client device using the user specific manifest file;

wherein the content origination server is further operable to provide program content fragments to the client device based on requests received from the client device using the user specific manifest file.

10. The system of claim 8, further comprising:

an advertising server operable to provide one or more replacement advertisement content manifest files from an advertisement server;

wherein modifying the generic manifest file comprises replacing references to at least a portion of advertisement content identified by the generic manifest file with references to the replacement advertisement content based upon the retrieved replacement advertisement content manifest file.

11. The system of claim 8, further comprising a navigation server operable to provide program selections to a user and to provide universal resource identifiers identifying the manifest server, a content selection, and a client device.

12. The system of claim 11, wherein the universal resource identifier comprises one or more of a cookie or embedded information in the universal resource identifier for the manifest file.

13. The system of claim 8, wherein the manifest server is further operable to retrieving a first version of the generic manifest file from a local cache, to determine whether the first version of the generic manifest file is up to date, and retrieve a new version of the generic manifest file from the content origination server if the first version of the generic manifest file is not up to date.

* * * * *